United States Patent [19]

Tosconi et al.

[11] Patent Number: 4,991,675
[45] Date of Patent: Feb. 12, 1991

[54] HOOD TILT MECHANISM

[75] Inventors: James J. Tosconi, Fort Wayne; Steven A. Burke, New Haven, both of Ind.

[73] Assignee: Navistar International Transportation Corp., Chicago, Ill.

[21] Appl. No.: 256,004

[22] Filed: Oct. 11, 1988

[51] Int. Cl.⁵ .............................................. B62D 25/10
[52] U.S. Cl. .................................. 180/69.21; 49/379; 49/386; 180/89.17; 267/291
[58] Field of Search ................. 180/69.2, 69.21, 89.17, 180/89.18, 68.4, 68.6; 49/379, 386; 267/291, 150, 168, 174, 178

[56] References Cited

U.S. PATENT DOCUMENTS

| | | | |
|---|---|---|---|
| 1,883,629 | 10/1932 | Dresser | 180/68.6 |
| 2,650,088 | 8/1953 | Formanek | 267/291 |
| 3,017,944 | 1/1962 | Norrie | 180/69.21 |
| 3,419,099 | 12/1968 | Brumbaugh et al. | 180/69.24 |
| 3,754,613 | 8/1973 | Stephens et al. | 180/69.21 |
| 4,281,733 | 8/1981 | Miller et al. | 180/69.21 |
| 4,359,119 | 11/1982 | Kammerman | 49/386 |
| 4,566,552 | 1/1986 | Hoffmann et al. | 180/69.21 |

FOREIGN PATENT DOCUMENTS

| | | | |
|---|---|---|---|
| 684973 | 4/1964 | Canada | 180/69.21 |
| 1290020 | 2/1987 | U.S.S.R. | 267/291 |
| 1298446 | 3/1987 | U.S.S.R. | 267/168 |

Primary Examiner—Andres Kashnikow
Assistant Examiner—Eric Culbreth
Attorney, Agent, or Firm—F. David AuBuchon; Dennis K. Sullivan

[57] ABSTRACT

A hood tilt control mechanism includes a hood support brakcet having one hinge leaf attached to the chassis including a longitudinally extending slot for slidably receiving one end of a telescoping hood tilt assist mechanism and a second hinge leaf attached to the hood and providing a pivotal mount for the other end of the assist mechanism. The assist mechanism telescopes or extends respectively against the bias of opening or closing springs disposed adjacently on the assist mechanism so that when the hood is closed, the closing spring exerts a counterbalancing force on the hood to assist its opening. As the hood opens the closing spring force goes to zero and, as the hood moves to the open position, the opening spring is engaged by the mechanism to dampen the motion of the hood, ultimately stops the hood by interference of the spring coils, and counterbalances the hood weight in the open position to assist closing. When the hood is closed, similar damping, stopping, and counterbalancing functions are performed by the closing spring.

17 Claims, 2 Drawing Sheets

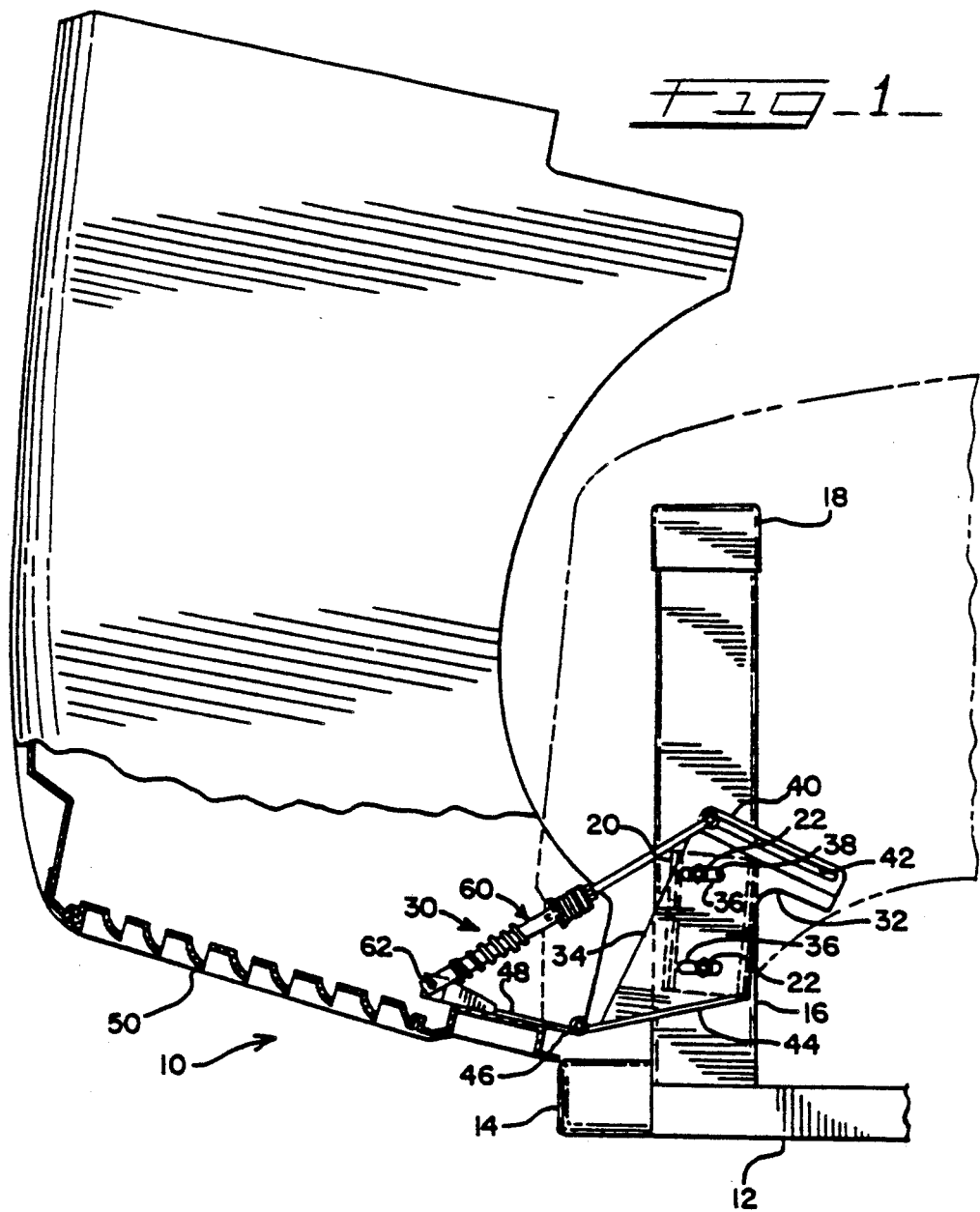
FIG_1
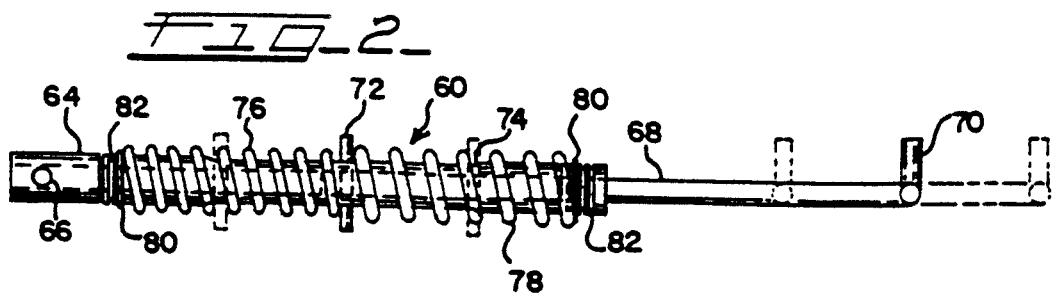
FIG_2

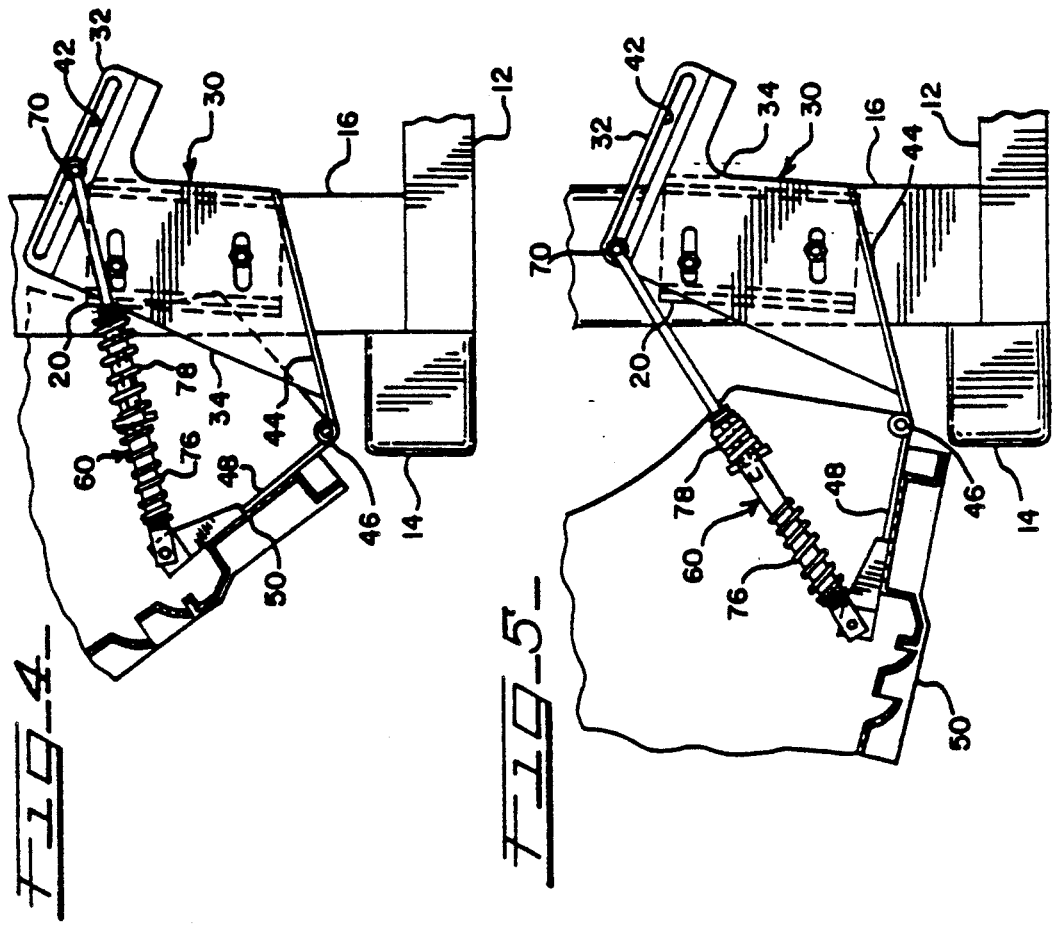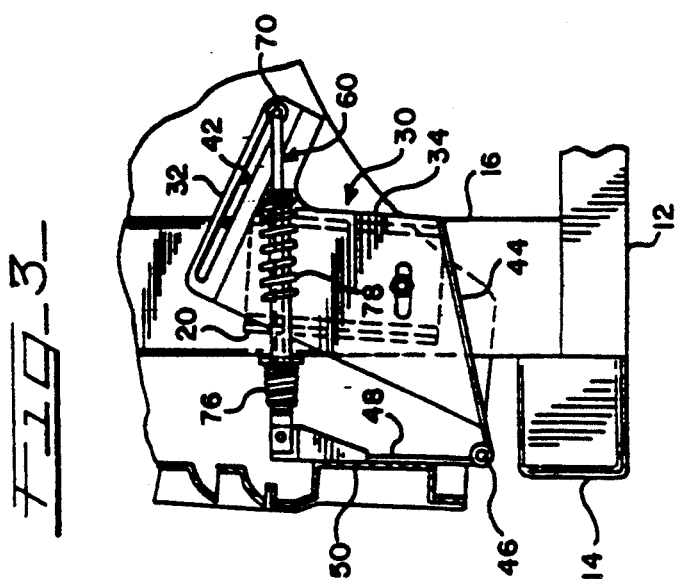

HOOD TILT MECHANISM

This invention relates to hood tilt mechanisms of the type utilized in medium and heavy duty conventional trucks having an engine covering hood and, more particularly, to a hood tilt mechanism wherein all hood control functions are provided in a single apparatus.

BACKGROUND OF THE INVENTION

Conventional medium and heavy duty trucks have a large engine covering hood which tilts about a transverse pivot axis located above the bumper to expose the engine for servicing. Although commonly made of lightweight materials, these hoods are nevertheless heavy and cumbersome in part because of the relatively long moment arm between the center of gravity of the hood and the pivot axis. In addition to the mass of the hood, there is also the problem of arresting its movement toward either the open or closed position.

Various devices for dealing with these problems have been used including counterbalance springs, cables, shock absorbers, and gas springs. In particular, U.S. Pat. No. 3,419,099 to Brumbaugh et al teaches an air assist cylinder connected between the vehicle frame and the hood. Disposed within the cylinder between the piston and the rod end is a compression spring which acts to cushion the movement of the hood toward the open position.

SUMMARY OF THE INVENTION

In the present invention, all of the hood functions including the hinge, hood assist mechanism, hood damping mechanism, and hood stop as well as the hood position adjustment are combined into a single relatively compact component, two of which provide the exclusive mounting and motion controlling connection between the hood and chassis, except for the engine cowling limiting the hood movement in the closed position and a means to lock the hood in a closed position.

To this end, a hood support bracket comprises a hinge leaf which carries the hood pivot pin and has a longitudinally extending slot which slidably receives one end of the hood tilt assist mechanism, the other end being pivoted on the hood hinge leaf. The hood tilt assist mechanism telescopes or extends respectively against the bias of opening and closing compression springs disposed adjacently on the assist mechanism. When the hood is closed, the closing spring exerts a counterbalancing force on the hood to assist its opening. As the hood opens, the closing spring counterbalancing force goes to zero and, as the hood moves further toward its open position, the opening spring is engaged by the mechanism which dampens the motion of the hood, ultimately stops the hood motion by the spring becoming solid, and counterbalances the hood weight in the open position to assist closing. When the hood is closed, similar damping, stopping, and counterbalancing functions are performed by the closing spring.

The hood support bracket is further provided with parallel oversized slots to permit fore-and-aft and limited pivotal movement to facilitate adjustment of the hood pivot axis and thus the hood position on the truck.

DETAILED DESCRIPTION OF THE DRAWINGS

Other objects and advantages of the invention will become apparent upon reading the following description thereof and upon reference to the drawings in which:

FIG. 1 is a side elevation of the forward portion of a truck, the open hood being partially cut away to illustrate the hood tilt mechanism of the present invention;

FIG. 2 is an enlarged side view of the hood tilt assist mechanism shown in FIG. 1;

FIG. 3 is an enlarged side view of the hood tilt mechanism of FIG. 1 with the hood in the closed position;

FIG. 4 is enlarged side view similar to FIG. 3 but with the hood in the over-center position; and, FIG. 5 is an enlarged side view similiar to FIG. 3 with the hood in the open position.

DETAILED DESCRIPTION OF THE PREFERRED EMBODIMENT

Referring to the drawings, there is shown the forward portion of a conventional truck 10 of the type having an engine mounted on the vehicle frame forwardly of the operator's compartment. The truck 10 includes a mobile frame of a known design including a fore-and-aft extending left frame rail 12 which supports a bumper 14 in a conventional matter. Rearwardly of the bumper, a radiator support 16 is attached to the frame rail 12 and extends upwardly therefrom to support one side of the vehicle radiator 18. Near its lower end, the radiator support 16 has an intermediate bracket 20 attached thereto in fixed position, the bracket 20 having a pair of vertically spaced transversely extending studs 22 projecting therefrom to receive a hood tilt mechanism generally designated 30. It will be appreciated that the truck 10 also has a bumper, frame rail, radiator support, intermediate bracket, and hood tilt mechanism 30 on its right side (not shown) which will be substantially identical to the parts shown in the drawings except for the left side-right side reversal thereof.

In accordance with the invention, the hood tilt mechanism 30 includes a hood support bracket 32 formed from metal plate and having an intermediate portion 34 lying in a fore-and-aft extending plane and having a pair of vertically spaced fore-and-aft extending parallel slots 36 providing an opening 38 sufficiently larger than the shank portion of studs 22 so that the hood support bracket 32 may be moved fore-and-aft relative to the radiator support or rotated within the range provided by the slot length about either the upper or lower of the studs 32 for adjustment purposes. The upper portion 40 of hood support bracket 32 defines a fore-and-aft slot 42 extending somewhat upwardly forwardly as shown in the drawings. The lower portion 44 of hood support bracket 32 is outturned to become a transversely extending hinge leaf extending downwardly forwardly from the radiator support 16 to carry a transverse pivot pin 46 disposed above the vehicle bumper 14.

A hood hinge leaf 48 is pivotally mounted on pivot pin 46 and extends radially therefrom to a transverse plate portion to which the hood 50 is fixedly attached using slotted holes (not shown) to permit side to side adjustment of the hood relative to the truck frame 12 and cab portion mounted thereon. With the right side mounting (not shown), the hood 50 is swingable about the pivot pin 46 between an open positon with the hood center of gravity forward of the pivot pin, an intermediate over-center positon with the hood center of gravity above the pivot pin, and a closed position with the hood center of gravity rearward of the pivot pin, as illustrated in FIGS. 3, 4, and 5. The motion of the hood 50 is controlled manually and is regulated and assisted by the hood tilt assist mechanism generally designated 60 having one end pivotally attached to the hood hinge leaf 48 as at 62 and its other end slidably disposed in slot 42 in the hood support bracket 32.

Viewing the hood tilt assist mechanism in greater detail, and referring to FIG. 2, it will be seen that the hood tilt assist mechanism 60 includes a tubular base member 64, having a diametral hole 66 at one end for pivotal mounting to hood hinge leaf 48, which telescopingly receives a rod 68, the latter extending out of the base member 64 to a radially outturned end portion 70 slidably engaged in slot 42 of the hood support bracket 32 with suitable means to retain it therein. Near its end within the base member, the rod 68 carries a radially projecting pin 72 which passes through a slot 74 in the tubular base member 64. Disposed on the outside of the tubular base member on either side of the pin 72 are a closing compression spring 76 and an opening compression spring 78, the opening spring 78 having a larger wire diameter and thus a higher spring rate for reasons which will be discussed below. The remote ends of the springs 76 and 78 are respectively restrained by the tubular base member 64 by snap rings 80 selectively disposed in one of a plurality of grooves 82 provided in the exterior surface of the base member 64 to permit adjustment of the point at which the springs 78 and 80 become solid to limit further travel of the hood assist mechanism 60 and the hood 50 in that direction.

With the exception of the hood 50 mating in its closed position with the engine cowling or forward portion of the operators cab (not shown) as well as the means for locking the hood in its closed position, the hood tilt mechanism 30, including the assist mechanism 60, thus comprises the only hood motion controlling structure connecting the hood with the vehicle frame and chassis. To put it another way, the hood tilt mechanism 30 provides the exclusive connection between the hood and the chassis when the hood is in the open position.

In operation, when the hood 50 is in the closed position shown in FIG. 3, the end portion 70 of rod 68 engages the rearward end of slot 42 in the hood support bracket 32 causing the hood tilt assist mechanism to be telescoped to its shortest length so that the closing springs 76 is nearly compressed solid thus providing a counterbalancing of the weight of the hood 50. Less counterbalancing, by the use of a lower spring rate in the closing spring 76 is provided than in the open positon of the hood 50 because the center of gravity in the closed position is closer to the pivot axis than in the open position.

When the vehicle operator begins to open the hood, the closing spring acts to assist the opening by counterbalancing a portion of the load until the closing spring is no longer compressed and the rod end 70 leaves the end of slot 72. It will be appreciated that as the hood 50, is opened by pivoting it about the pivot axis 46 carried on the hood support bracket 32, its center of gravity moves forwardly and so less force (and consequently less counterbalancing) is required until the hood 50 reaches the over-center postion shown in FIG. 4 wherein the rod end portion 70 of the assist mechanism 60 is midway in slot 42 and no load is exerted on the assist mechanism or on the springs. Additionally, in this position no force is required by the operator to maintain the hood in this position.

As the hood 50 moves to the open positon, the rod end portion 70 will first contact the forward end of slot 42 causing the rod 68 to be drawn out of the tubular base member 64 thus compressing the opening spring 78. The compression of the opening spring 78 retards the motion of the hood until the spring 78 finally becomes solid and stops or limits the hood in its fully open positon shown in FIG. 5 with the spring 78 counterbalancing a portion of the hood weight.

The closing motion of the hood is substantially the reverse of the opening motion except that the closing spring 78 does not go solid as explained above.

Thus there has been provided, in accordance with the invention, a hood tilt mechanism which fully meets the objects, aims and advantages set forth above. In view of the foregoing description, those of ordinary skill in the art will recognize alternatives and modifications that may be made without departing from the true scope of the invention. One such alternative is that the telescoping of the hood assist mechanism and thus, the opening and closing positons of the hood, could be limited by allowing the pin 72 of the rod 68 to contact the ends of the slot 74 in the base member. However, the ability to adjust the open position of the hood can be lost by using this limiting method. In any case, it is intended to cover all such alternatives and modifications as may fall within the scope of the appended claims.

What is claimed is:

1. A motor vehicle hood tilt apparatus comprising:
a motor vehicle supporting framework;
a hood supporting bracket mounted to said framework, said bracket providing a hinge pivot axis extending transversely of the path of travel of said vehicle;
a manually operated, engine-covering hood pivotally mounted to said hood supporting bracket for swinging movement about said hinge pivot axis between an open position wherein the hood center of gravity is forward of said pivot avis, an intermediate over-center position, and a closed position wherein said hood center of gravity is rearward of said pivot axis; and
a hood tilt assist mechanism having a first end pivotally attached to said hood and a second end engaged with said hood supporting bracket, said hood tilt assist mechanism incorporating means for counterbalancing the weight of said hood in both said open position and said closed position and for limiting travel of said hood in said open position, said hood tilt assist mechanism being the exclusive connection means between said hood and said framework, other than said pivotal mounting therebetween, in said open position;
said assist mechanism comprising first and second elongated members disposed in telescoping engagement and connected respectively to said hood and said hood supporting bracket, a first compression spring means operatively coupled between said first and second elongated members to be compressed when said hood is in its open position, and a second compression spring means operatively coupled between said first and second members to be compressed when said hood is in its closed position, said first elongated member comprising a tube having an axially extending slot in its periphery and said second elongated member comprising a rod slidably disposed within said tube, said rod having a radially extending pin extending through said slot in said tube, said first and second spring means being disposed on the outside of said tube respectively on each side of said radially extending pin for engagement therewith, and stop means respectively attached to the exterior of said tube engageable with the ends of said first and second spring means remote from said pin.

2. The invention in accordance with claim 1 and said stop means comprising a snap ring selectively disposed in one of a plurality of grooves in the exterior surface of said tube to permit adjustment of the location of one of said spring means.

3. The invention in accordance with claim 1 and said axially extending slot being of sufficent length to avoid contact with said pin in all positions of adjustment of said stop means.

4. The invention in accordance with claim 3 and one of said spring means having a larger spring constant than the other to permit variable amounts of counterbalancing in the open and the closed position.

5. The invention in accordance with claim 1 and said hood support bracket having a pair of parallel slots disposed in a longitudinally extending planar portion thereof, and a pair of bolt means extending respectively through said slots to mount said bracket to said supporting framework, said slots being sufficently larger than the shank portion of said bolt means to permit limited rotation of said hood support bracket about a bolt means shank thereby providing vertical and longitudinally adjustment of said hood pivot axis.

6. In a motor vehicle of the type having a supporting framework, an engine mounted on said framework, a manually operated covering hood pivotally mounted to said supporting framework for swinging movement about a transverse axis forward of said engine between a closed position covering said engine, an intermediate over-center position, and an open position exposing said engine, the improvement comprising a hood tilt assist mechanism, said hood tilt mechanism being the exclusive connection means in said open position between said hood and said framework, having telescopingly engaged first and second members respectively connected to said hood and said framework, a pair of helical coil compression springs disposed in end-to-end relation on one of said first and second members and having their mutually remote ends restrained by said one member against movement separating said springs, the other of said first and second members carrying a spring-engaging projection disposed between but unattached to the adjacent ends of said compression springs, said projection operatively engaging one of said springs in said open position and the other of said springs in said closed position.

7. The invention in accordance with claim 6 and selectively variable locating means for restraining the remote ends of said springs.

8. The invention in accordance with claim 6 and said springs having different spring rates.

9. The invention in accordance with claim 6 and said projection operatively engaging and loading said springs in intermediate positions between said over-center position and respectively said open and closed positions.

10. The invention in accordance with claim 9 and the coils of one of said springs becoming closed in said open position of said hood to limit further movement of said hood toward said open position.

11. The invention in accordance with claim 9 and said framework including a longitudinally extending slot, one of said telescoping members of said control mechanism engaging said slot, and slot being so disposed that upon said hood being in said overcenter position, said engagement of said slot is at an intermediate position thereof and said control mechanism is in an intermediate position within its range of telescoping.

12. The invention in accordance with claim 11 and said hood pivotal mounting axis being carried by a hood support bracket attached to said framework, said longitudinally extending slot being disposed in said bracket.

13. The invention in accordance with claim 12 and said hood supporting bracket having a pair of parallelly disposed slots and fastening means extending through said slots to adjustably mount said bracket to said framework.

14. In a motor truck having a mobile frame, a radiator support beam mounted on said frame and projecting upwardly therefrom, and an engine covering hood disposed for manually actuated swinging movement between a closed position and an open position substantially forward of said radiator support, a hood tilt apparatus comprising:

a hood supporting bracket having a medial portion adapted to be attached to said radiator support, a lower portion extending forwardly from said medial portion and terminating in a hinge leaf supporting a transverse axis pivot pin, and an upper longitudinally extending plate portion having an upwardly forwardly extending slot;

a hood hinge leaf, adapted to be attached to said hood, pivotally mounted to said pivot pin;

a telescoping hood assist and travel limiting means pivotally mounted to said hood hinge leaf and slidably mounted in said slot, said hood assist and travel limiting means having a tubular base member, a closing compression spring, and an opening compression spring disposed in axially adjacent relation along the base member and having their remote ends restrained thereby, and a rod member slidably disposed within said tubular base member, said rod member having means disposed between the adjacent ends of said springs for operatively engaging said closing spring, upon movement of said hood toward said closing position, and said opening spring spring, upon movement of said hood toward said position, said springs being disposed to retard the motion of said hood respectively toward said open and said closed position.

15. The invention in accordance with claim 14 and selectively variable position stop means attached to said base member to restrain the remote ends of said springs.

16. The invention in accordance with claim 14 and said closing spring having a lower spring rate than said opening spring.

17. The invention in accordance with claim 14 and said medial portion of said hood support bracket having two parallel fore-and-aft extending slots adapted to receive fasteners extending through each of said slots and attached to said radiator support, said slots being sufficiently larger than said fasteners to permit limited pivoting movement of said bracket about one of said fasteners.

* * * * *